United States Patent [19]

Rahman et al.

[11] Patent Number: 4,893,279

[45] Date of Patent: Jan. 9, 1990

[54] STORAGE ARRANGEMENT HAVING A PAIR OF RAM MEMORIES SELECTIVELY CONFIGURABLE FOR DUAL-ACCESS AND TWO SINGLE-ACCESS RAMS

[75] Inventors: Mahboob F. Rahman, Sunnyvale; Dakshesh D. Parikh, San Jose; Marita E. Daly, El Cerrito; Bu-Chin Wang, Saratoga, all of Calif.

[73] Assignee: Advanced Micro Devices Inc., Sunnyvale, Calif.

[21] Appl. No.: 309,976

[22] Filed: Feb. 13, 1989

Related U.S. Application Data

[63] Continuation of Ser. No. 836,024, Mar. 4, 1986, abandoned.

[51] Int. Cl.[4] .................. G11C 7/00; G11C 8/00; G06F 12/00; G06F 13/00
[52] U.S. Cl. .................. 365/230.03; 365/230.04; 365/189.04; 364/200; 364/900
[58] Field of Search .......... 365/189, 230, 221, 230.03, 365/230.04, 189.04; 364/200 MS File, 900 MS File

[56] References Cited

U.S. PATENT DOCUMENTS

| | | | |
|---|---|---|---|
| 4,151,593 | 4/1979 | Jenkins et al. | 364/200 |
| 4,158,235 | 6/1979 | Call et al. | 365/49 |
| 4,339,804 | 7/1982 | Davison et al. | 365/230 |
| 4,384,342 | 5/1983 | Imura et al. | 364/900 |
| 4,420,819 | 12/1983 | Price et al. | 364/900 |
| 4,438,493 | 3/1984 | Cushing et al. | 364/200 |
| 4,445,191 | 4/1984 | York | 364/900 |
| 4,583,168 | 4/1986 | Pang et al. | 365/94 |
| 4,608,667 | 8/1986 | Barry | 365/189 X |
| 4,623,990 | 11/1986 | Allen et al. | 365/189 X |
| 4,689,741 | 8/1987 | Redwine et al. | 365/189 |
| 4,691,303 | 9/1987 | Churchward et al. | 365/189 |
| 4,729,119 | 3/1988 | Dennison et al. | 365/230 X |

OTHER PUBLICATIONS

SYS DISGN/Memory SYSs, Computer Design, Aug. 1, 86, "Fi Fo RAM Controller Tackles Deep Data Buffering", by Tom Pai, pp. 109–112.

*Primary Examiner*—James W. Moffitt
*Assistant Examiner*—Alfonso Garcia
*Attorney, Agent, or Firm*—Keneth Salomon; Richard E. Cummins

[57] ABSTRACT

A storage device capable of being configured either as a single-access memory or as two separate memories is described. The storage device is especially suited for use in a digital signal processor performing numeric algorithms such as fast fourier transforms, autocorrelation and digital filtering because certain of such algorithms require fast dual access to two correlated, but separate, parameters while other such algorithms require fast single access to identical parameters. The storage device is shown in an exemplary embodiment empolying a multiplexer to affect writing of data from either of two data busses to one of the memories. In a second embodiment the write port of the memory is connected to one bus and the read port is connected to both busses. In this embodiment a dual-port address register file and a pair of address generation units provide indirect addressing capability for the storage device. Method of operating separate memories in a single-access or a dual-access mode is also described.

7 Claims, 1 Drawing Sheet

STORAGE ARRANGEMENT HAVING A PAIR OF RAM MEMORIES SELECTIVELY CONFIGURABLE FOR DUAL-ACCESS AND TWO SINGLE-ACCESS RAMS

This is a continuation of application Ser. No. 06/836,024, filed Mar. 4, 1986, which is now abandoned.

CROSS-REFERENCE TO RELATED, COPENDING APPLICATION

Related, copending application of particular interest to the instant application is U.S. Ser. No. 836,025, entitled "Memory Management Unit for Monolithic Digital Signal Processor" filed Mar. 4, 1986 and assigned to the assignee of the instant application.

FIELD OF THE INVENTION

The invention relates to storage devices in digital electrical circuits and, more particularly, to a device providing efficient access to at least two physically separate memories, especially in a dual-bus digital signal processor performing fast fourier transformations, autocorrelation or filtering operations.

BACKGROUND OF THE INVENTION

Signal processing generally refers to the performance of real-time operations on a data stream. Accordingly, typical signal processing applications include or occur in telecommunications, image processing, speech processing and generation, spectrum analysis and audio processing and filtering. In each of these applications, the data stream is generally continuous. Thus, the signal processor must produce results, "through-put", at the maximum rate of the data stream.

Conventionally, both analog and digital systems have been utilized to perform many signal processing functions. Analog signal processors, though typically capable of supporting higher through-put rates, are generally limited in terms of their long term accuracy and the complexity of the functions that they can perform. In addition, analog signal processing systems are typically quite inflexible once constructed and, therefore, best suited only to the singular application anticipated in their initial design.

A digital signal processor provides the opportunity for enhanced accuracy and flexibility in the performance of operations that are very difficult, if not impractically complex, to perform in an analog system. Additionally, digital signal processor systems typically offer a greater degree of post-construction flexibility than their analog counterparts, thereby permitting more functionally extensive modifications to be made for subsequent utilization in a wider variety of applications. Consequently, digital signal processing is preferred in many applications.

The process of digital signal processing typically implements a numeric algorithmic operation performed on a digital data stream sampled over time. The end result of the algorithmic operation, depending on the nature of the algorithm, can readily provide for the modification or analysis of the digital data stream or for the generation of a new data stream based on some aspect of the original data stream input. Central to the implementation of such algorithmic operations are the use of numeric algorithms for performing differential equation solving, fast Fourier transforms (FFT), auto-correlation and digital filtering, among many others. A numeric Fourier equation solving algorithm generally takes the form of:

$$y(n) = ax(n) + bx(n-1) + cx(n-2),$$

where y(n) is the current output and x(n−k) is the current input at a time k previous (k=0, 1, 2, 3 . . . ). Discrete or digital Fourier transforms, of the form:

$$X(k) = \sum_{n=0}^{N-1} x(n)e^{-j\omega k/N}$$

where k=0, 1, 2, 3, . . . (n−1) with X(k) being the discrete transform of a digitally sampled signal Y(n), are easier to implement numerically.

Alternately, decimation in time or frequency can be utilized to obtain substantially the same information. A decimation in time numeric algorithm generally takes the form of:

$$X = A + WB$$

$$Y = A - WB,$$

where A and B are of a time series of inputs represented as complex numbers, W is a decimation function and X and Y are decimated outputs. The decimation in time and frequency algorithms have the advantage of reduced numbers of multiplications and accumulations and the convenience of being executable within the same memory space that originally stores a series segment of the digital data stream being operated on.

A numeric implementation of the auto-correlation function is defined as:

$$R(k) = \sum_{n=0}^{N} x(n)^* x(n+k)$$

where R(k) is the kth auto-correlation co-efficient and x(n) is the nth data sample.

Finally, a numeric digital filtering function may be generally defined as:

$$y(n) = \sum_{i=0}^{M} A_i^* x(n-i)$$

where Y(n) is the filter output on its nth iteration, A* is the ith filter co-efficient and x(n−i) is the data sample taken as the input at the nth iteration. It is to be recognized that each of these algorithms may require simultaneous access to two data values, or "operands" as they are called, in real-time processing.

Such FFT, autocorrelation and filtering operations typically require simultaneous access to two operands, such as X(n) and X(n+k) in the case of autocorrelation, or A(i) and X(n−i) in the case of filter y(n). In the autocorrelation operation, then, a dual bus DSP makes most efficient use of storage by employing a dual-access random access memory (RAM) in which a single copy of array X is stored and the two array values X(n) and X(n+k) are independently and simultaneously accessed during the nth iteration.

In the filtering operation, on the other hand, there is need to simultaneously access the two separate arrays, A and X, at the nth iteration. In this case, two single-access RAMs provide the most efficient memory device, rather than a dual-port RAM.

SUMMARY OF THE INVENTION

A data storage device suitable for use in a dual data-bus digital signal processor (DSP) provides the user with programmable control over a flexible structure which employs two random access memories (a RAM_A and a RAM_B) which can be configured on a word-by-word basis as a single dual-access RAM or as two single-access RAMs.

In one embodiment of the instant invention, a multiplexer is placed on each of the data paths between a dual data-bus and the RAM_B. The RAM_A is connected via a bidirectional data path to an A data bus. Under control of instructions executed by the DSP, during the write cycle signals applied at inputs to the multiplexer allow for a write operation in which the RAMs are configured as either a dual-access RAM or a pair of single-access RAMs.

The contents of a location in each RAM, RAM_A and RAM_B, can be addressed independently during the read cycle and the contents simultaneously conducted to the processor portion of the DSP via the A data bus and the B data bus, respectively. Of course, if during the write cycle, the same array was stored in both RAM_A and RAM_B, data will be read from the same array, as required in the autocorrelation operation, while if different arrays were stored, data will be read from these different arrays, as required in the filtering operation. In each case, the most efficient memory configuration being employed.

In a second embodiment of the instant invention, the multiplexer placed on the data paths to the RAM_B is omitted and the write port of RAM_B is connected via a unidirectional data path to the A_data bus. The read port of RAM_B is connected via unidirectional data paths to both the A_data bus and the B_data bus. Data to be written to RAM_B is transferred from the A_data bus. Accordingly, if the RAMs are to be configured as a pair of single-access RAMs, the same data is readily written to both RAM_A and RAM_B from the A_data bus. If the RAMs are to be configured as a dual-access RAM, data written to RAM_B must be present on the A_data bus during the write cycle for RAM_B.

A multiplexer is used in the second embodiment which permits selection of the address generated at either of the ports of the dual-port address register to be used for access of RAM_A under instruction control. Another multiplexer is employed which selects the address to be used for access of RAM_B, under instruction controls. An additional input to the multiplexers is provided so that a direct address can be applied to the RAM_A and RAM_B, under instruction control.

Also, access to a memory external to the DSP is provided by a multiplexer receiving the addresses generated by the dual port register file and the direct address. Such external memory is especially useful in applications of the DSP in which data obtained in real-time is supplied by a central processing unit (CPU) and stored in the external memory and then used for real-time FFT, autocorrelation or filtering operations.

DETAILED DESCRIPTION OF THE PREFERRED EMBODIMENTS

Figure 1:
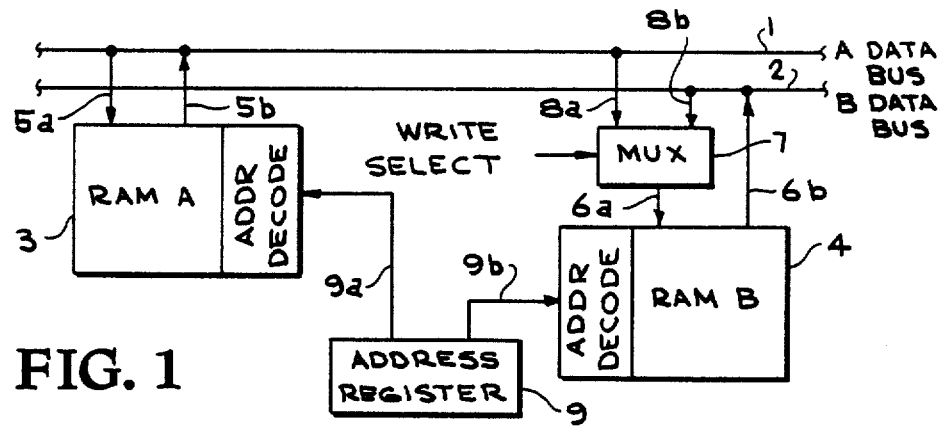
FIG. 1 illustrates an embodiment of the present invention providing a single/dual access storage device.

With reference to FIG. 1, a block diagram of a single/dual access storage device is shown. The device interconnects to a pair of busses, A_DATA bus 1 and B_DATA bus 2 which conduct in parallel signals representing data to and from a random access memory (RAM)_A 3 and a RAM_B 4, respectively, via lines 5a and 5b and 6a and 6b, respectively. A multiplexer (MUX) 7 generates signals on lines 6a, which are to be written to RAM_B 4, selectable from either A_DATA bus 1 or B_DATA bus 2. Signals are conducted on lines 8a and 8b from A_DATA bus 1 and B_DATA bus 2, respectively, to inputs of MUX 7 and a write select signal applied thereto determines which of these signals applied to MUX 7 will be passed to lines 6a, and, in turn, to RAM_B 4.

An address register 9 generates address signals on lines 9a and 9b received by an address decode portion of RAM_A 3 and RAM_B 4, respectively, indicating which memory location therein will be used to write thereto the data on line 5a and 6a, respectively, or to read therefrom the data onto line 5b and 6b, respectively.

Address register 9, in conjunction with the write-select signal applied to MUX 7, can be used to cause the device illustrated in FIG. 1 to function as a single/dual access storage device. By selecting MUX 7 to pass signals from A_DATA bus 1 to lines 6a, and generating signals on lines 9a and 9b representing corresponding locations within RAM_A 3 and RAM_B 4, respectively, identical data can be stored into corresponding locations of both RAMs, as is required in fast fourier transforms and autocorrelation signal processing applications, i.e., the device functions as a single-access storage device.

By selecting MUX 7 to pass signals from B_DATA BUS 2 to lines 6a, and generating signals on lines 9a and 9b representing corresponding locations with the RAMs, non-identical data can be stored into corresponding locations of the RAMs, the device functioning as a dual-access storage device.

Address register 9 must be capable of independently and concurrently generating identical or different address signals on lines 9a and 9b during the reading of data stored within RAM_A 3 and RAM_B 4. Write control signals applied to RAM_A 3 and RAM_B 4 (not shown in FIG. 1) are to be strobed at the same time to permit the device of FIG. 1 to store identical data in the corresponding location of both RAMs, when the storage device of FIG. 1 is operated in a single-access mode. The RAMs can be written to independently by applying unrelated addresses on signal lines 9a and 9b at unrelated times, when the storage device is operated in a dual-access mode.

Figure 2:
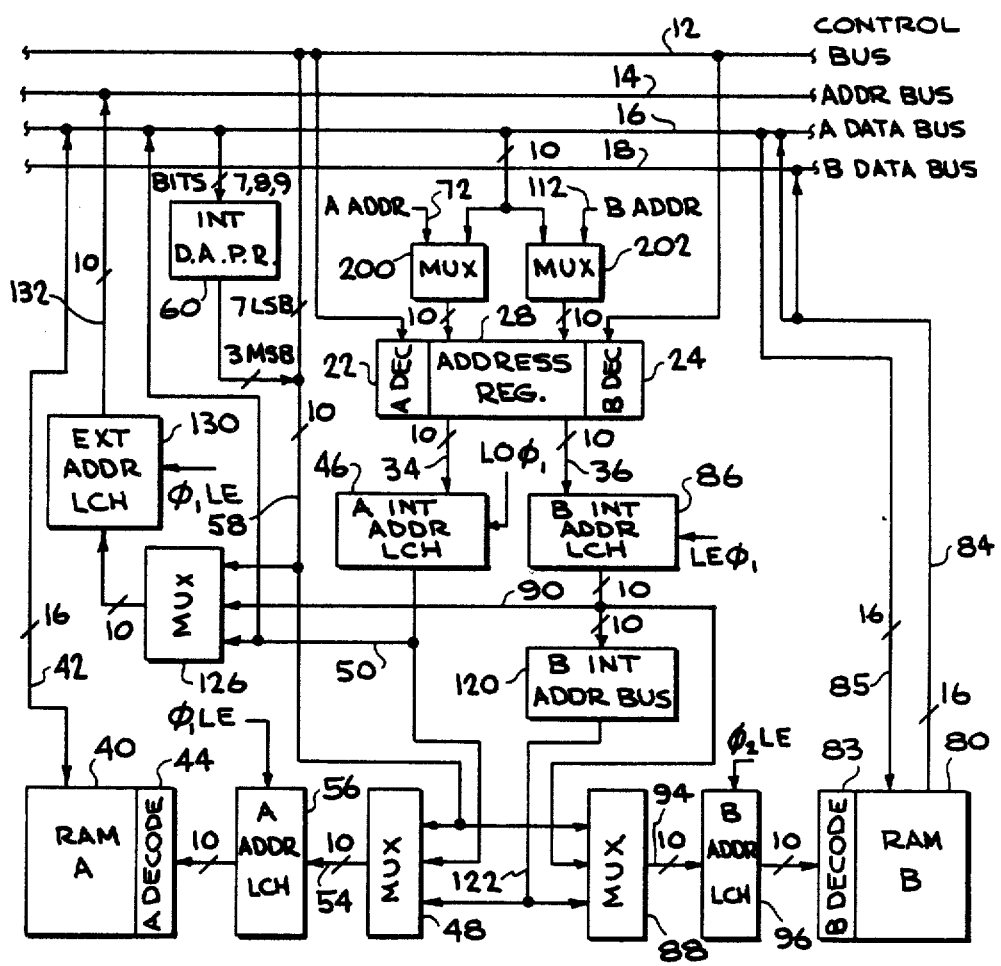
FIG. 2 illustrates in a second embodiment an enhanced version of the single/dual access storage device of the present invention.

An enhanced single/dual access storage device is illustrated in FIG. 2. The device illustrated in FIG. 2 is utilized within the memory management unit (MMU) 10 of a digital signal processor (DSP), which is the subject of the related, copending application U.S. Ser. No. 836,025, entitled "Memory Management Unit for Monolithic Digital Signal Processor" filed Mar. 4, 1986. The discussion which follows bears only on those aspects of the MMU 10 related to memory addressing. A complete description of the other aspects of the MMU 10 can be had by reference to the related, copending application and is incorporated herein by reference.

For ease of reference, elements illustrated in FIG. 2 of the instant application are labelled with the same reference numerals as like elements illustrated in the drawing figures of the related, copending application. Various signal lines are shown in FIG. 2, some of which, although shown as a single line are, in fact, multiple-conductor lines carrying several signals in parallel. Such lines are hash-marked on the figure with an adjacent numeral indicating the number of multiple conductors. An intruction-decode programmable logic array (PLA), not shown, generates control signals received by various elements shown in FIG. 2. The generation of these control signals is well understood by those skilled in the art and will not be described herein.

With reference to FIG. 2, a set of four busses is shown connected to various elements thereon. A control bus 12 conducts signals generated by a microsequencer portion of the DSP, not shown. Control signals are conducted via bus 12 from the microsequencer to the various elements of the MMU 10 in response to instructions executed by the microsequencer.

An external address (ADDR) bus 14 provides address signals for an external memory which may be used with the MMU 10. A description of this aspect of the MMU 10 of the present invention is in the related copending application, and is incorporated herein by reference.

A pair of busses, 16 and 18, conduct signals representing data between the various elements of the DSP and the MMU 10. In the discussion contained herein, these data busses are referred to as the A_DATA and B_DATA bus, respectively. These various elements of the DSP include the microsequencer, a computational unit, and interface logic.

In one application of the invention, the A_DATA bus connects to all internal registers in the DSP while the B_DATA bus 18 only connects to the input data port of the computational unit. Thus the MUX 7 of FIG. 1 is not required in the embodiment of the invention shown in FIG. 2.

An address register file 28, having an A_Decode and a B_Decode portion, 22 and 24, respectively, generates address signals to the A-side and B-side addressing units via signal lines 34 and 36, respectively. A pair of random access memories, referred to as the RAM_A and RAM_B, are used in conjunction with the address register file 28.

In response to signals generated by the microsequencer, the register file decoders 22 and 24 determine which register of register file 28 is selected and which internal bus is to be used to transfer data to or from a register or memory. A register accessed for an indirect address is decoded by the A-decoder 22 for all RAM_A or external memory source accesses and RAM_A or external memory destination accesses where the source is RAM_B 80 or an internal register. The A-decoder 22 is also used for all address register file 28 source accesses where the destination is not an indirectly addressed RAM_A or not an indirectly addressed external memory and address register file 28 destination accesses where RAM_B is the source.

A register accessed for an indirect address is decoded by the B-decoder 24 for all RAM_B source accesses and all memory destination accesses for which the A-decoder 22 does not perform the decode as described above. The B-decoder 24 is also used for all address register file 28 source and destination accesses where the A-decoder 22 does not perform the decode as described above.

A random access memory (RAM)_A 40 is provided to store data and is connected to the A_DATA bus 16 via bidirectional signal lines 42. The RAM_A can store a number of data words, each having an "address". The contents of each address can be read from, or written to, according to the signals applied to an A_address decode (A_DECODE) circuit 44, as will be appreciated by those skilled in the art.

The A-side address signals generated by register file 28 is conducted via signal lines 34 to an A-side internal address latch (A_$_{INT}$_ADDR_LCH) 46 which is enabled during $\phi_1$ of the first cycle of a one- or two-cycle data management timing scheme employed by MMU 10. The timing scheme is described in detail in the related copending application in connection with FIG. 5 thereof, such description is incorporated herein by reference. The latched address signal is conducted from A_INT_ADDR_LCH 46 to a multiplexer (MUX) 48 via signal lines 50.

MUX 48 also receives direct address signals from the Control bus 12 via signal lines 58 and an address generated by a B-side address generation unit, as will be described hereinafter. A direct address received by MUX 48 consists of a least-significant seven-bit portion received from control bus 12 and a most-significant three-bit portion generated by an internal direct address page register (INT_DAPR) 60. A control signal generated by an instruction decode PLA, not shown, causes MUX 48 to select either the direct address or the address signals generated by the A-side or B-side address generation unit to be generated on signal lines 54. These signals are, in turn, received by a RAM_A address latch (_ADDR_LCh) 56, which contents is updated during $\phi_1$ and the latched address signals are applied to the A_DECODE circuit 44 for use in accessing the contents of the specified address within RAM_A 40.

The INT_DAPR 60 receives signals representing the seventh, eight and ninth bit positions of the signals on the A_DATA bus 16 and can generate a set of three signal bits representing "page" information. The seven least-significant bits as specified by an instruction executed by the microsequencer of the DSP are conducted on the control bus 12 and the three most-significant bits generated by the INT_DAPR 60 are combined to form a ten-bit direct address and signals representing this RAM_A address are conducted to the MUX 48 via signal lines 58.

A B-side address generation unit comprising a RAM B 80, a B_DECODE 83, a B_INT_ADDR_LCH 86, connected by a signal line 90 to a MUX 88, a B_ADDR_LCH 96 connected to MUX 88 via signal line 94, generates a RAM_B 80 address.

The B-side address generation unit operates similarly to the A-side as described hereinbefore and its operation will therefore not be described in detail, except to note that the read port of RAM_B 80 is connected to the A_DATA bus 16 and the B_DATA bus 18 via signal lines 84 and the write port of RAM_B is connected to the A_DATA bus via signal lines 85. A B-side internal address buffer (B_INT_ADDR_BUF) 120 receives the contents of B_INT_ADDR_LCH 86 via signal lines 90. The B_INT_ADDR_BUF 120 is required to delay the access of memory internal to the MMU 10. As such, the B_INT_ADDR_BUF 120 receives a latch enable signal during $\phi_2$ of the timing scheme, thereby delaying the generation at its output of an internal address to occur such that data from both external and internal memory becomes available simultaneously because of the overhead cost of accessing external memory when operands are to be fetched from both internal and external memory concurrently. The delay is also needed when external memory is written to internal memory, or a register. The address generated by B_INT_ADDR_BUF 120 is conducted to the second inputs of MUX 48 and MUX 88 via signal lines 122.

Data may be written from the external memory to either, or both, RAM_A 40 and RAM_B 80, in either the single or dual access mode using the addressing scheme, described above. Signals representing the data received from external memory are conducted via the A_DATA bus 16 to the single/dual access storage device illustrated in FIG. 2. This data may then be written to the A_RAM 40 and B_RAM 80, as described above, in either a single or dual-access mode.

A multiplexer (MUX) 126 receives the latched addresses from A_INT_ADDR_LCH 46, B_INT_ADDR_LCH 86 via signal lines 50 and 90, respectively, and the direct address via signal lines 58. Under control of signals generated by an instruction decode PLA, MUX 126 generates a set of external address signals to an external address latch (EXT_ADDR_LCH) 130. EXT_ADDR_LCH 130, in turn, applies the address signals to the ADDR bus 14 via signal lines 132, after latch 130 receives a latch enable (LE) signal during $\phi_1$.

A multiplexer (MUX) 200 can select either the address generated by an A-side address generation unit and applied to an input of MUX 200 via signal lines 72 or the address conducted to a second input of MUX 200 from A_DATA bus 16. The selected address being conducted to a first set of the registers within dual register file 28. A multiplexer (MUX) 202 can similarly select from the address generated by a B-side address generation unit to an input of MUX 102 via signal lines 112 or the address on A_DATA bus 16 to be conducted to a second set of register within dual file register 28.

By providing the same address on lines 50 and 90, as would be the case if the same register was accessed by the A_ and B_decoders 22 and 24 of the register file 28, the corresponding locations within RAM_A 40 and RAM B 80 can be used to store identical data. Write enable control signals are then applied simultaneously to both RAM_A 40 and RAM_B 80 and data signals, provided on the A_DATA bus 16 by virtue of the signal lines 42 and 85 connecting both RAM_A 40 and RAM_B 80 and the A_DATA bus is written to both RAMs. The device then operating in its single-access mode, when this data is subsequently read from those locations of RAM_A and RAM_B via lines 42 and 84 onto A_DATA bus 16 and B_DATA bus 18, respectively.

The connections between the A_DATA bus 16 and the B_DATA bus 18 and RAM_B 80 removes the need for the multiplexer 7 used in the embodiment of the invention shown in FIG. 1. Furthermore, as there are no registers internal to the DSP which use the B_DATA bus 18 to conduct data signals to RAM_B 80, it removes the need for MUX 7. Independent address signals may be concurrently or independently applied to RAM_A 40 and RAM_B 80 via lines 50 and 90, respectively, to cause the device to operate in a dual-access mode, as described above in connection with the device illustrated in FIG. 1. In this mode, data written to RAM_B 80 must be present on the A_DATA bus 16 during the write cycle for RAM_B.

While the description of the invention has been given with reference to particular embodiments, it is understood that various alternative embodiments, more suitable in a particular application, are within the scope of the invention. For example, when random access memories (RAM) were used for illustrative purposes, read only memories (ROM) may be substituted for a portion of the memory. THe use of a ROM would be suitable for storage of the coefficients of a polynomial or an array which does not change, such as the coefficients used in numerical digital filtering. Such variations are contemplated by the appended claims and the invention is limited solely by the claims.

We claim:

1. A memory arrangement having first and second storage modes for use with a digital signal processor comprising in combination,
   (a) first and second data buses connected to said signal processor,
   (b) first and second memories, each of which includes a plurality of addressable data storage locations,
   (c) first transferring means connected between said first data bus and said first memory for transferring first data between said first memory and said first data bus during said first and second modes,
   (d) second transferring means connected between said second second memory and said first and second data busses for
      (1) transferring said first data from said first data bus to said second memory and from said second memory to said second data bus during said first mode, and
      (2) transferring second data from said first data bus to said second memory and from said second memory to said second data bus during said second mode,
   (e) addressing means connected to said memories for supplying addresses to said first and second memories, and
   (f) control means, connected to said addressing means and said transferring means, operable in response to;
      (1) a first mode signal to cause said first data on said first data bus to be simultaneously stored in corresponding locations of said first and second memories and subsequently during said first mode to be simultaneously transferred from said corresponding said locations to said first and second data busses, and
      (2) a second mode signal to cause said first data and said second data from said first data bus to be stored in corresponding said locations of said first and second memories respectively during said second mode and subsequently transferred during said second mode to said first and second data busses, respectively.

2. The memory arrangement set forth in claim 1 in which each of said memories includes,
   (a) a write port and a read port for transferring data to and from said memory,
   (b) said first transfer means connecting said read port of said first memory to said first data bus,
   (c) said second transfer means connecting said read port of said second memory to said second data bus whereby data stored in corresponding locations of said first and second memories can be transferred simultaneously to said data busses.

3. The memory arrangement set forth in claim 1 in which each of said memories includes,
   (a) a write port and a read port for transferring data to and from said memory,
   (b) said first transferring means connecting said write port and said read port of said first memory to said first data bus,
   (c) said second transferring means connecting said write port of said second memory to said first data bus and said read port of said second memory to said first and second data busses.

4. The memory arrangement set forth in claim 2 further including,
   (a) a control bus and an address bus, and
   (b) means connecting said control bus and said address bus to said addressing means to permit direct address signals to be supplied to said addressing mans from said control bus.

5. The memory arrangement set forth in claim 4 in which said addressing means includes,
   (a) a first addressing system for said first memory,
   (b) a second addressing system for said second memory,
   (c) a first address generating unit,
   (d) a second address generating unit, and
   (f) means for selectively transferring address data from one of said address generating units to said first and second addressing systems.

6. The memory arrangement set forth in claim 5 including a main system memory storing an operand which is transferable therefrom through said first data bus for use by said digital signal processor and in which said second address generating unit includes,
   (a) an address buffer having an output connected to said first and second addressing systems, and
   (b) means for transferring data comprising another operand stored in said second memory at the address specified by said address buffer simultaneously with data being transferred from said main memory whereby said digital signal processor is supplied with two separate operands.

7. A method for use with a digital signal processor to control the dual mode transfer of first and second operands between a memory storage system and a pair of data busses connected to said signal processor, said system including,
   (A) first and second random access memories, each said memory having a,
      (a) separate addressing means for addressing storage locations in said memory, and
      (b) separate write and read cycles for transferring data between each said memory and said pair of data busses, and
   (B) means connected to said separate addressing means for generating addresses for said separate addressing means, said method comprising the following combination of steps;
      (1) storing one operand from one said data bus of said pair of data busses during one said mode in said first memory at a first said storage location and simultaneously the same said operand in said second memory at a said location corresponding to said first location by generating said write cycles simultaneously for said memories,
      (2) simultaneously transferring during said one mode said one operand from said first memory and said same said operand from said second memory, to said pair of data busses by generaating said read cycles simultaneously for said memories,
      (3) storing during a second said mode, first and second different operands from said one data bus, at said locations in said first and second memories by generating write cycles for said memories at different times corresponding to when said different operands are on said one data bus, and
      (4) simultaneously transferring during said second said mode said first and second operands from said first and second memories respectively to said pair of data busses by generating said read cycles simultaneously for said first and second memories.

* * * * *